April 26, 1966     R. B. MATTHEWS     3,247,887
SPARK IGNITION SYSTEM
Filed Sept. 4, 1962     6 Sheets-Sheet 1
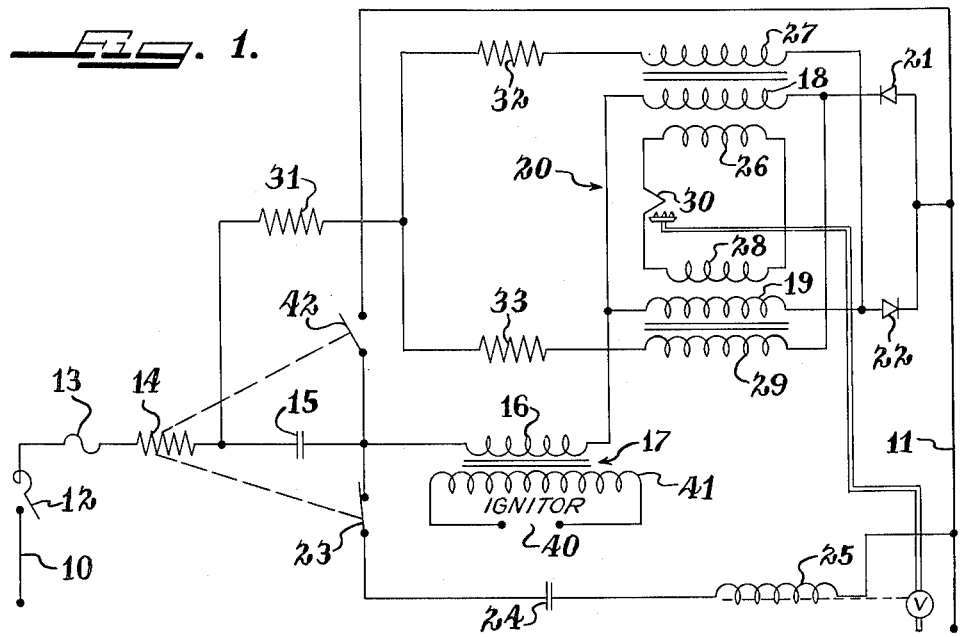
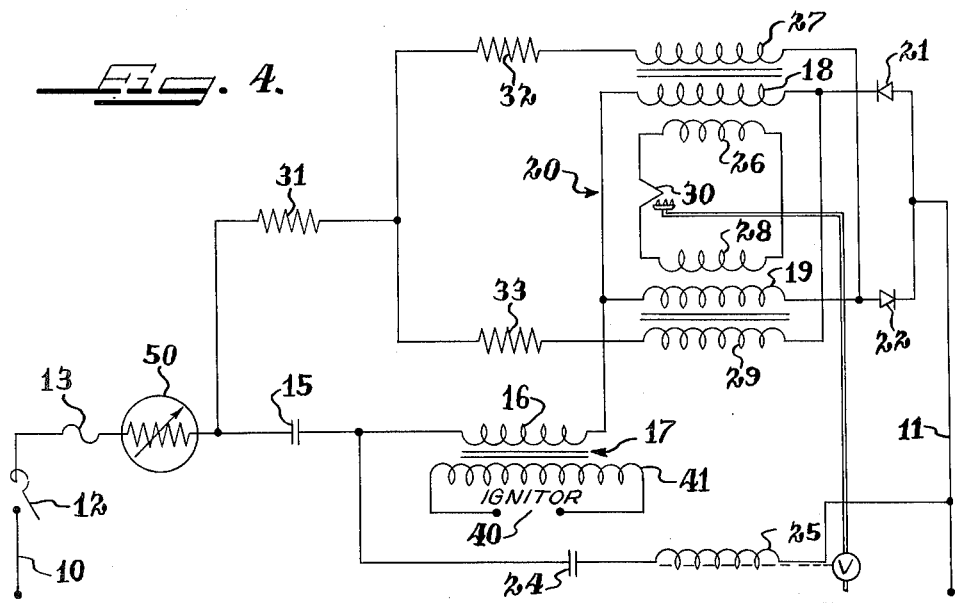
INVENTOR.
RUSSELL B. MATTHEWS

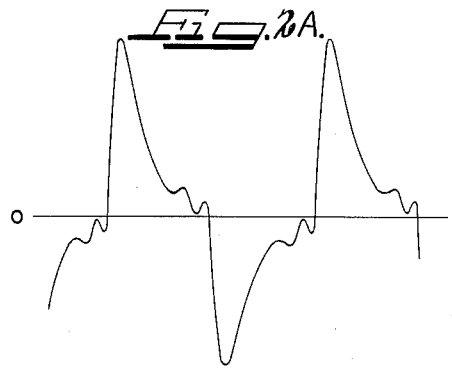
FIG. 2A.
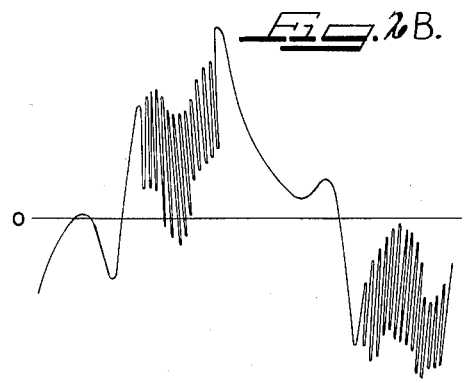
FIG. 2B.
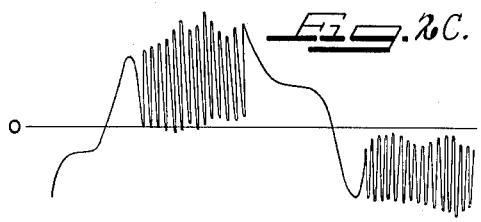
FIG. 2C.
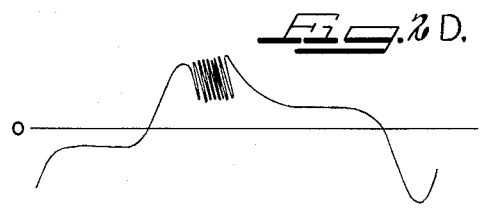
FIG. 2D.
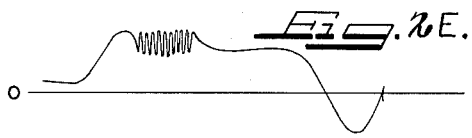
FIG. 2E.
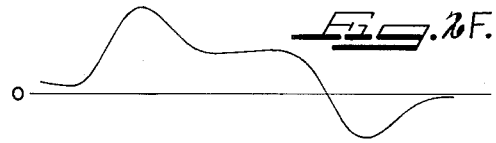
FIG. 2F.
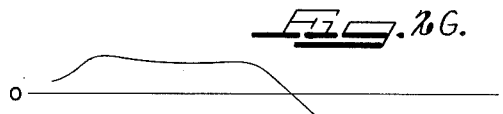
FIG. 2G.
FIG. 3.
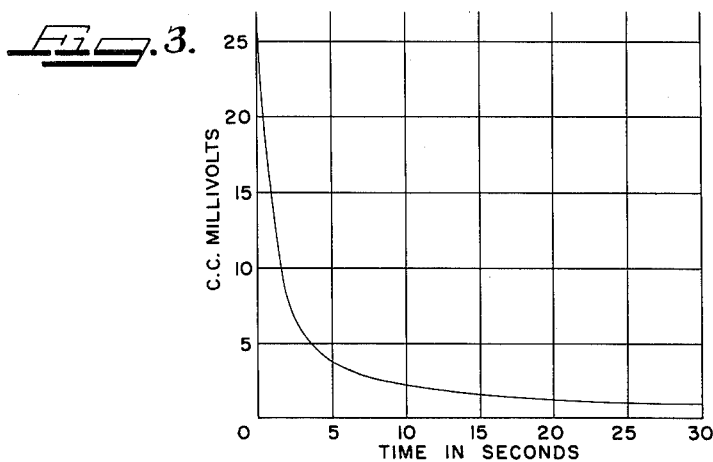

April 26, 1966   R. B. MATTHEWS   3,247,887
SPARK IGNITION SYSTEM
Filed Sept. 4, 1962   6 Sheets-Sheet 4
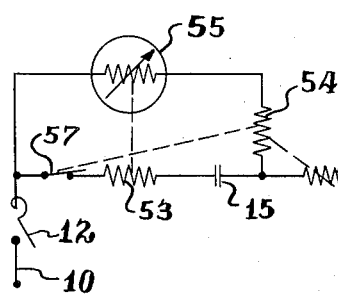
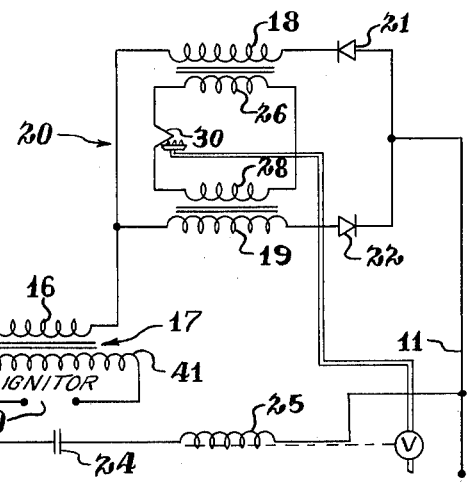
Fig. 8.
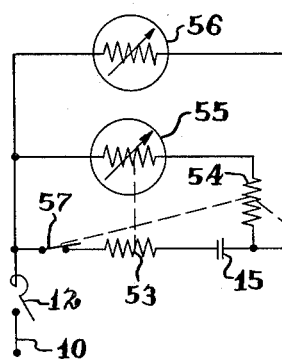
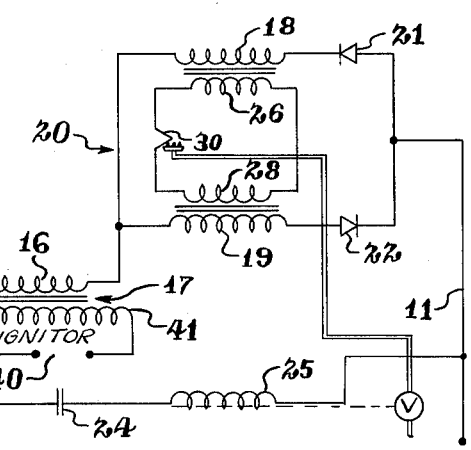
Fig. 9.
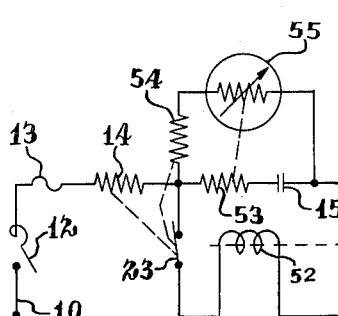
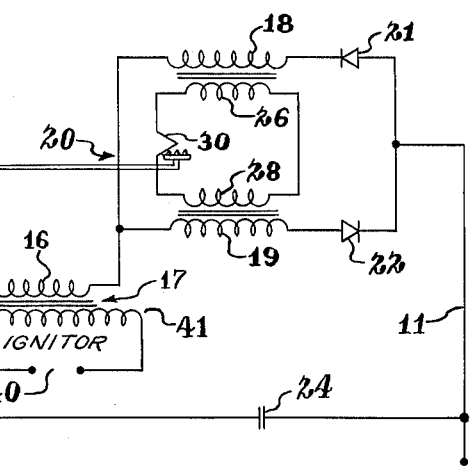
Fig. 10.

April 26, 1966  R. B. MATTHEWS  3,247,887
SPARK IGNITION SYSTEM
Filed Sept. 4, 1962  6 Sheets-Sheet 5

April 26, 1966 R. B. MATTHEWS 3,247,887
SPARK IGNITION SYSTEM
Filed Sept. 4, 1962 6 Sheets-Sheet 6

United States Patent Office 3,247,887
Patented Apr. 26, 1966

3,247,887
SPARK IGNITION SYSTEM
Russell B. Matthews, Wauwatosa, Wis., assignor to Penn Controls, Inc., a corporation of Indiana
Filed Sept. 4, 1962, Ser. No. 221,069
35 Claims. (Cl. 158—125)

The present invention relates to spark ignition systems and more particularly to a direct spark ignition system for igniting gas burners.

It has been normal practice in the gas burner art to provide a small gas pilot flame which will ignite a main burner when gas flow is delivered to the main burner. Safety devices are often provided which prevent the main burner from being supplied with gas when the pilot flame is out. However, the pilot flame is normaly re-ignited manually. In many installations in the past, the manual relighting of a pilot light after it has been accidentally blown out or extinguished by lack of a sufficient gas supply presented no particular hardship since the main burner installation was normally located either at ground or building floor level. However, with the advance of heating devices which are presently being installed near the ceilings of buildings and in other relatively inaccessible places, the problem of manually re-igniting a pilot flame has become more severe. The present invention overcomes this problem by providing a direct spark ignition system which eliminates the need for manually lighting a pilot flame.

In the liquid fuel field, it has been common practice to utilize direct spark ignition systems such as are presently used to ignite oil burners. However, such spark ignition systems have been constructed of multiple relays having a multiplicity of switching contacts. As is well known in the art, relays have inherent reliability limitations. The present invention provides a spark ignition system of considerably higher reliability by either reducing the switches involved to a single warp switch or by completely eliminating any moving electrical-mechanical components.

Thus, it is an object of the present invention to provide a direct spark ignition system for gas burners.

Another object is to provide a new and improved spark ignition system for fluid fuel burners.

Another object is to provide a fluid fuel ignition system which employs only solid state components except for the fluid fuel control valve.

A further object of the present invention is to provide a magnetic amplifier connected in series with a primary coil of a spark igniter transformer across a source of alternating current.

A primary object of the present invention is to provide a spark ignition system which will attempt to reignite the main burner after an interruption in the burner flame before sufficient raw fuel has accumulated in the vicinity of the burner to produce a hazardous condition.

Yet another object is to provide a direct spark ignition system which will shut off a fuel flow to a burner whenever fuel ignition at the burner has not been accomplished in a sufficiently short time to prevent a hazardous amount of raw fuel from accumulating in the vicinity of the burner.

An important object is to provide a direct spark igniter connected in series with a magnetic amplifier across a source of alternating current and a thermocouple sensitive to the heat of a main burner flame connected to a control winding means of the amplifier to effectively reduce or shut off an ignition spark after a flame has appeared at the burner.

Another object of the present invention is to provide an ignition voltage across a spark gap from a secondary of a transformer which is much larger than the voltage conventionally provided when the primary is connected directly to a source of sinusoidal alternating current.

An important object of the present invention is to provide a high amplitude RF voltage across a spark gap for the ignition of a fluid fuel burner.

Yet another primary object of the invention is to provide a circuit in series with a transformer which, if connected across a sinusoidal alternating current source alone, would be inadequate to produce an ignition spark across a spark gap.

Further objects and advantages will become apparent from the following detailed description taken in connection with the accompanying drawings in which:

FIG. 1 is a schematic diagram of an embodiment of the present invention;

FIGS. 2a through 2g are a series of graphs of voltage wave forms appearing across a high voltage ignition transformer contained in an embodiment of the present invention shown in FIG. 1;

FIG. 3 is a graph of a typical cooling curve for a thermocouple utilized in the embodiment illustrated in FIG. 1;

FIG. 4 is a schematic diagram of a second embodiment of the present invention;

FIG. 8 is a schematic diagram of a sixth embodiment of the present invention;

FIG. 9 is a schematic diagram of a seventh embodiment of the present invention;

FIG. 10 is an eighth embodiment of the invention;

Figure 5:
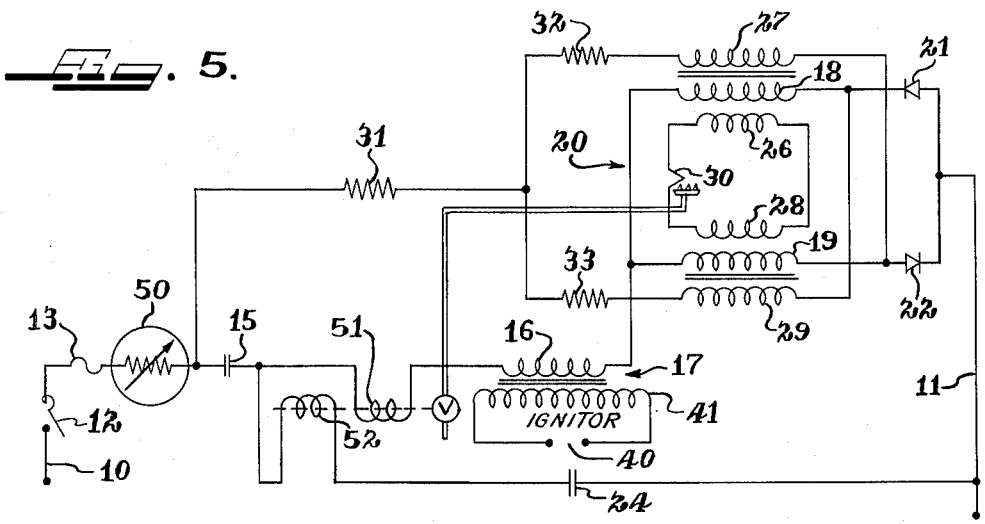
FIG. 5 is a schematic diagram of a third embodiment of the present invention.

While this invention is susceptible of embodiment in many different forms, there are shown in the drawings and will herein be described in detail several embodiments of the invention with the understanding that the present disclosure is to be considered as an exemplification of the principles of the invention and is not intended to limit the invention to the embodiments illustrated. The scope of the invention will be pointed out in the appended claims.

For the purpose of understanding the present invention, it is convenient to think of it as consisting of an ignition circuit and a safety circuit. These circuits are not physically separable and many of the elements essential to one circuit are also essential to the operation of the other circuit. Thus, the circuits are conceptually separable but they are not structurally separable. The ignition circuit consists principally of a normally conducting magnetic amplifier in resonance with a capacitance which serves to simultaneously energize a gas valve and a spark gap. Heat from an ignited gas burner then heats a thermocouple which cuts off the magnetic amplifier to deenergize the spark gap. Whenever there is a failure to ignite, the safety circuit cuts off the spark and the gas.

Referring to FIG. 1, a pair of power leads 10 and 11 are connected across a source of alternating current voltage (not shown). Whenever a thermostat switch 12 is closed, two principal series circuits are established between the power leads 10 and 11. The first of these series circuits consists of a fuse 13, a warp switch heater 14, a resonating capacitor 15, a primary winding 16 of a high voltage transformer generally indicated at 17, a pair of load windings 18 and 19 of a magnetic amplifier generally indicated at 20 connected in parallel and a pair of rectifiers 21 and 22 serially connected with each of the load windings 18 and 19 respectively. Each load winding is wound on a separate iron-core to form a two reactor full wave magnetic amplifier. Since rectifiers are conventionally used with multi-load winding magnetic amplifiers, they are generally considered by those skilled in the art to be included as part of the general magnetic amplifier structure. Therefore, reference to the magnetic amplifier 20 will include the rectifiers 21 and 22. The second principal series circuit consists of the means for limiting electrical current in the form of the fuse 13, the warp switch heater 14, the resonating capacitor 15, a set of warp switch contacts 23 which are actuated from their closed to their open position by the energization of the warp switch heater 14, a condenser 24, and an electrical valve actuator in the form of a solenoid coil 25 which opens a fluid flow valve V whenever the coil is sufficiently energized. In conjunction with the load winding 18, the magnetic amplifier 20 has a control winding 26 and a bias winding 27, and in conjunction with load winding 19 the magnetic amplifier has a control winding 28 and a bias winding 29. The magnetic amplifier 20 may be of any conventional design which incorporates such pairs of load, control and bias windings. The control windings 26 and 28 are connected in series with a thermocouple 30 which is placed to sense the presence of burning at a burner which is supplied with gas controlled by the solenoid coil 25. The bias winding 27 is connected in series between the warp switch heater 14 and the rectifier 22 with a resistance 31 and a resistance 32, and the bias winding 29 is connected between the warp switch heater 14 and the rectifier 21 with the resistance 31 and a resistance 33 in order to provide a bias voltage for the respective load windings 18 and 19.

The ignition spark for igniting gas at a burner is produced at a spark gap 40 which is connected across a secondary winding 41 of the transformer 17. Another series circuit is provided by connecting a junction of the capacitor 15, the primary winding 16, and contacts 23 to the power lead 11 through a normally open set of warp switch contacts 42 which are operated by the warp switch heater 14.

The operation of the embodiment of the invention illustrated in FIG. 1 will now be described in detail. When the thermocouple 30 is cool, no thermocouple produced voltage is provided across the control windings 26 and 28 and the magnetic amplifier 20 is, therefore, in resonance with the resonating capacitor 15 whenever thermostatic switch 12 closes to provide energization to this resonant system and the transformer 17. As may be seen in FIG. 2a, the resonant circuit of magnetic amplifier 20 and capacitor 15 transforms a sinusoidal alternating current provided by the power leads 10 or 11 into a series of sharp high voltage pulses. The steep wave front of these pulses is the result of the magnetic amplifier iron cores saturating. The plateau region just prior to the steep wave front indicates that the iron coils of the magnetic amplifier are not yet saturated. When the cores saturate their impedance drops to only internal resistance. The reactors cease providing counter-electromotive force very suddenly since the change in magnetic flux stops abruptly as the maximum flux level is reached. However, the voltage supplied by the power lead is still increasing and the flux continues to increase in the primary winding 16 of the transformer 17 at a very rapid rate as indicated by the steep wave front in FIG. 2a. The transformer 17 has many less turns in its windings than would be required to amplify the sinusoidal alternating current provided by the leads 10 and 11 to a sufficient high value for creating a spark at the spark gap 40. However, with the present invention a small transformer 17 is sufficient to create a spark at the spark gap 40 because the energy in each half sinusoidal cycle has been transformed into a short high voltage pulse. Thus, a large saving in manufacturing cost, size and weight is achieved over the transformers normally required to step up normal sinusoidal line voltages to sufficient voltages for creating a sparkover at a spark gap. As soon as several cycles of high voltage pulses have appeared across spark gap 40, the air in the gap will be sufficiently ionized for sparkover to commence as shown in FIG. 2b. The voltage across the transformer windings and thus across the spark gap 40 rises at the beginning of the steepleading edge of a pulse previous to sparkover. However, before reaching the peak voltage ionization of air in gap 40 causes an oscillating discharge across the gap providing an RF type spark with each half cycle of the sinusoidal current provided by the power leads 10 and 11 rather than just a single direct current spark as would be provided if the sinusoidal current in the leads were merely stepped up by a conventional transformer. The frequency of the RF spark will be in the very low frequency RF range. Thus, a more reliable spark for the ignition of gas at the burner is achieved than if only a direct current spark were provided on each half cycle of the sinusoidal current occurring on the power leads.

Once burning of the gas has been achieved at the burner assume that the gas at the burner is ignited by the spark. The thermocouple 30 will commence to heat up and place a voltage across the control windings 26 and 28. Thus, the thermocouple current generates a magnetic force that is in opposition to the reactor winding magnetic force. This causes the iron core flux density to move out of a saturated region which results in a marked increase in inductive reactance. A change in inductive reactance moves the circuit out of series resonance with capacitor 15 to abruptly increase the total circuit impedance of the order of 10 to 1. This will de-energize transformer 17 to de-energize the spark at the spark gap 40. FIGS. 2c to 2e show the effect of the thermocouple upon the RF spark as it heats. In FIG. 2c, the magnitude of the spark has just been slightly reduced by the increased impedance. In FIGS. 2d and 2e, the impedance is increased to the point that the amplitude of the RF spark is being substantially reduced. FIG. 2f shows the wave form across the transformer 17 after the spark has been cut off by the steadily increasing impedance in the formerly resonant ignition circuit. The thermocouple 30 will continue to heat until it stabilizes at an operating temperature. The resultant voltage across the transformer 17 is illustrated in FIG. 2g which shows that the impedance has increased to the point that very little current flow exists in the aforementioned first series conduit.

During each trial for ignition, the magnetic amplifier cores are operated in a saturated region. FIG. 3 shows a hypothetical cooling curve for the thermocouple. If it is assumed that the alternating voltage provided across the power leads 10 and 11 is 115 volts with a possible tolerance of plus or minus 17 volts, it is, of course, desirable to make certain that the thermocouple can cool sufficiently when the lead voltages are only 98 volts to prevent more than 15 seconds of raw fuel to reach a burner in any critical burner application. If no bias windings 27 or 29 were provided in the magnetic amplifier, the thermocouple would be required to produce approximately 12 millivolts when it is heated to turn off a spark which was being produced by a sinusoidal alternating current of 132 volts between the power leads 10 and 11. Therefore, the thermocouple must produce over 12 millivolts when it is at a steady state operating condition to make certain that the spark can be extinguished at the highest expected line voltage. If the power leads provided only 98 volts, the spark would not appear on the thermocouple coils until the thermocouple output was reduced to approximately one or two millivolts which, as may be seen from FIG. 3, would take in excess of 30 seconds. The embodiment of the invention illustrated in FIG. 1 utilizes the bias winding to oppose the control winding so as to cancel out approximately five to ten millivolts. The thermocouple 30 must, therefore, be large enough to generate 12 millivolts plus 10 millivolts required to neutralize the effect of the bias coil windings. Therefore, the thermocouple will start from the 25 millivolt point on the curve in FIG. 3 and a spark at the spark gap 40 will appear in the five to ten millivolt region which results in a response time of the order of three to four seconds for a momentary gas interruption. It is of prime importance to have the cool down time cut as short as possible because if there is any substantial length of time required for the thermocouple to cool sufficiently before a new spark is produced, such a spark interruption at the burner would allow a substantial amount of raw gas to emerge from the burner. Although in some applications the rate of gas flow and the construction of the burner and its combustion chamber may be such that a 30-second flow of raw fuel would not be hazardous, there are many applications where even a 15-second flow of raw gas into the combustion chamber would create a very hazardous situation. Therefore, although the principles of the present invention could be utilized without incorporating bias windings in the magnetic amplifier, they should be utilized in all applications where the thermocouple cooling time versus the flow of raw fuel is critical.

During one half cycle of the alternating current cycle provided across the power leads, rectifier 21 is conducting and the flux in the non-conducting core is being reset by winding 29 which is in opposition to the flux generated by the winding 19. During the other half cycle, rectifier 22 is conducting and winding 27 resets the flux in the non-conducting core. It will be noted that the single pair of rectifiers 21 and 22 not only provide for the non-conducting condition of the load windings 18 and 19 on the respective half cycles but they also provide the necessary rectifiers in the bias winding circuits.

When the first series circuit is energized, and the thermocouple is sufficiently cool for a spark to be ignited, the second series circuit, which includes the solenoid coil 25, will carry sufficient current to actuate solenoid 25 and open a gas valve allowing gas to reach the burner. However, if a non-resonant condition has been brought about by the heating of thermocouple 30 and the shifting of the magnetic amplifier cores out of their saturation region, a sufficiently high impedance appears across the condenser 15 to drop the current available across the solenoid coil 25 to a level that will hold the valve open but will not be sufficient to actuate the valve from a closed position to an open position if the valve should be closed. Therefore, the increase of approximately ten to one of impedance in the resonant circuit also increases the impedance in the second series circuit to the point that solenoid 25 can act only as a holding solenoid and not an actuating solenoid for a gas valve which controls gas flow to the burner. Thus, the impedance appearing across the condenser 15 when the first series circuit is out of resonance increases the resistance in the second series circuit to the point that if there is a momentary interruption in the current of the power leads 10 and 11, the gas will be shut off from the burner and will not be turned on again until the thermocouple has cooled sufficiently to reduce the impedance occurring across condenser 15 by bringing the cores sufficiently back into their saturation region to allow enough current to be provided to the solenoid 25 to cause its actuation from a closed to an open gas valve position. The design of the solenoid 25 is so adjusted that its operation as an actuator of the gas valve cannot occur until the spark has been reestablished in the spark gap 40. Thus, the operation of impedance occurring across the condenser 15, the design of the spark firing level and the solenoid 25 form a portion of the aforementioned conceptual safety circuit. Elements of the first series circuit are, therefore, combined with elements of the second series circuit to perform this safety function.

Capacitor 24 acts as a surge limiting impedance whenever an open circuit is present in either rectifier 21 or rectifier 22. Whenever one of these rectifiers is open, the parallel branch of the first series circuit across capacitor 24 and solenoid coil 25 is open circuit for one-half of a cycle, this causes unidirectional pulses of current to flow through capacitor 24 and solenoid coil 25 with the result that capacitor 24 becomes charged during the early portion of the unidirectional pulse and thereby limits the current flow through the valve solenoid 25 sufficiently to prevent actuation of the gas valve.

Thus, another feature of a conceptual safety circuit is to prevent actuation of a gas valve whenever there is an open circuit in one of the rectifiers or their associated wiring.

The warp switch heater 14, contacts 23 and contacts 42 form the principal structure of a warp switch which may be of any conventional design known to those skilled in the art. When a bimetal arm of such a switch, which controls both sets of contacts, is heated by heater 14, it will open the normally closed contacts 23 and close the normally open contacts 42.

In the event that a trial for ignition is unsuccessful, the warp switch heater 14 will cause the warp switch contacts 23 to open and de-energize the valve solenoid 25 to shut off the gas and simultaneously close the warp switch contacts 42 to shunt current around the primary winding 16 and the magnetic amplifier 20. The shunting action shuts off the spark and keeps the circuit from overheating. Thus, after an appropriate length of time, the warp switch heater 14 controls the shutting off of both the spark and the gas. If for any reason the set of contacts 42 should fail to close under these conditions, fuse 13 will cause all circuits to become open. Thus, fuse 13 is in effect a backup to contacts 42. The warp switch in combination with the fuse forms a third reliable safety feature of the theoretical safety circuit which is the cutting off of both gas and spark after a sufficient time has been provided for a successful trial for ignition and the trial has failed.

As aforementioned, the theoretical safety circuit accomplishes three safety features: (1) the prevention of turning on the gas to a burner after a momentary interruption in the electrical power supply, (2) the protection against an open circuit in the rectifiers or their associated wiring and (3) the cutting off of both gas and spark after a sufficient time has elapsed to indicate an unsuccessful trial for ignition. FIGS. 4 through 17 each illustrate another embodiment of the present invention in which the above features of the safety circuit are accomplished by the incorporation of slightly different elements and circuit connections. However, in each embodiment, the elements and operation of the basic ignition circuit remain unchanged. Referring now to FIG. 4, an embodiment of the present invention is illustrated in which all electrical, mechanical and moving parts have been replaced by solid state components. The components of the warp switch have been replaced by a positive temperature coefficient thermistor 50 which may be a Westinghouse type 802-1 or of other manufacture with similar characteristics. Elements in FIGS. 4 through 17, which are similar to those elements in FIG. 1, bear the same identification numeral. The primary function of the warp switch in the safety circuit shown in FIG. 1 was the cutting off of both spark and gas after sufficient time had elapsed for a successful ignition. Thermistor 50 performs this function by increasing its resistance. At the end of a designated period for a successful ignition, the resistance of the thermistor has risen to a point that the impedance of both the first and second series circuit has risen to a point that the spark has been extinguished and the current through solenoid 25 has dropped sufficiently low that the solenoid can no longer hold a gas valve open. Therefore, the circuit of FIG. 4 represents an embodiment of the present invention in which a maximum degree of reliability has been achieved by the elimination of all electrical-mechanical and moving parts. The functions of the other elements in FIG. 4 are the same as described for FIG. 1.

In the other embodiments of the invention to be described, only the variation in structure and operation from previously discussed embodiments will be described.

The embodiment of the invention as illustrated in FIG. 5 is the same as FIG. 4 with the exception that two solenoid coils 51 and 52 are employed in the first and second series circuit respectively instead of a single coil 25. The embodiment of the invention illustrated in FIG. 5 is particularly useful where large gas valves are utilized. Coil 51 is an actuation aid coil and coil 52 is a holding coil for a large gas valve. When current is first applied across the series circuit, the cores of the amplifier 20 are in the saturation region and the impedance of the first series circuit is low, providing a relatively large current in coil 51 as well as in coil 52. With a large current passing through both coils, an attached gas valve is opened. After burning has commenced and the thermocouple 30 has heated up, the aid provided by the coil 51 is substantially removed. Although the increased impedance appearing across condenser 15 also causes the current through coil 52 to be reduced, there is sufficient magnetic force remaining with a closed magnetic material flux path, as is provided when a solenoid coil is in its actuated position, to hold a valve open. Thus current through coil 52 is sufficient to keep the valve open as long as there is no interruption in electrical power. If there should be an interruption in electrical power from leads 10 and 11, the gas valve would close and if power were returned after a very small time interval, the holding coil 52 alone could not open it for it requires the help of the actuation aid coil 51 to actuate the valve from a closed to an open position. Coil 51 cannot provide such aid until the thermocouple has cooled sufficiently to allow a spark to be provided across the spark gap 40. Thus, this embodiment differs from the embodiment illustrated in FIG. 4 by the fact that the prevention of re-opening gas after a momentary electric power failure is accomplished by a pair of coils, one in each respective series circuit instead of by a single solenoid coil.

Figure 6:
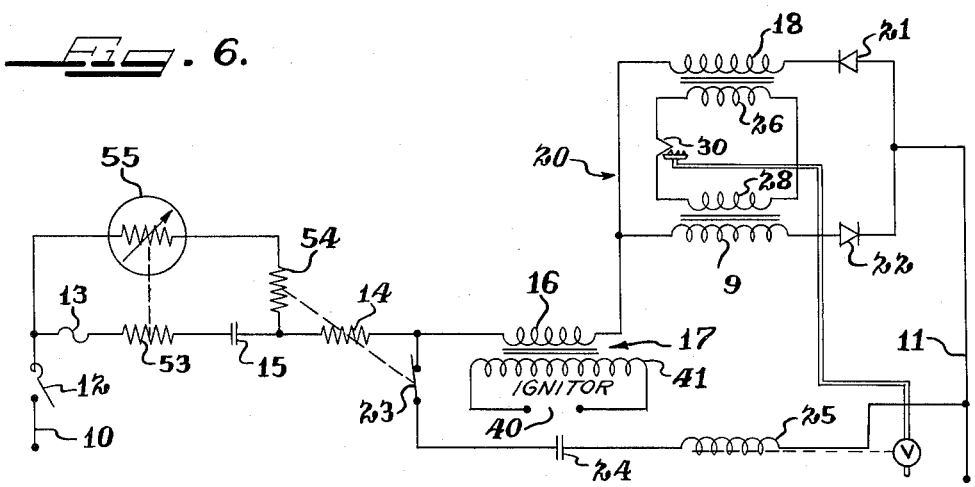
FIG. 6 is a schematic diagram of a fourth embodiment of the invention.

Referring now to FIG. 6, an embodiment of the present invention is shown which differs from the aforementioned embodiments in that a negative temperature coefficient thermistor and a warp switch are utilized. Instead of having a warp switch heater in the first and second series circuit, a resistor 53 is provided between a fuse 13 and a resonating condenser 15 and a warp switch heater 54 and a negative temperature coefficient thermistor 55 are provided in a parallel series circuit. Heat generated by the resistor 53 while it is energized is utilized to start the thermistor operation of thermistor 55 at sub-zero temperatures. If a trial for ignition fails, warp switch heater 14 causes the warp switch contacts 23 to open and thereby de-energizes solenoid 25 to shut off gas flow to a burner. Thermistor 55 also starts to heat and in approximately one minute decreases its resistance low enough to effectively short capacitor 15 and shift the first series circuit out of resonance with a resulting decrease in current flow of approximately 250 milliamperes to 50 milliamperes through heater 14 and primary winding 16 which extinguishes the spark. Heater 14 has a resistance of approximately 50 ohms while heater 54 has a resistance of approximately 200 ohms. Therefore, as the themistor resistance decreases, the current in heater 54 increases to hold the warp switch set of contacts 23 open. In the event that the circuit comprising thermistor 55 and warp switch heater 54 becomes open circuited, the current flow through warp switch heater 14 will remain high and contacts 23 will remain open and fuse 13 will open circuit to remove power and provide a visual signal to the effect that a component failure has occurred.

Figure 7:
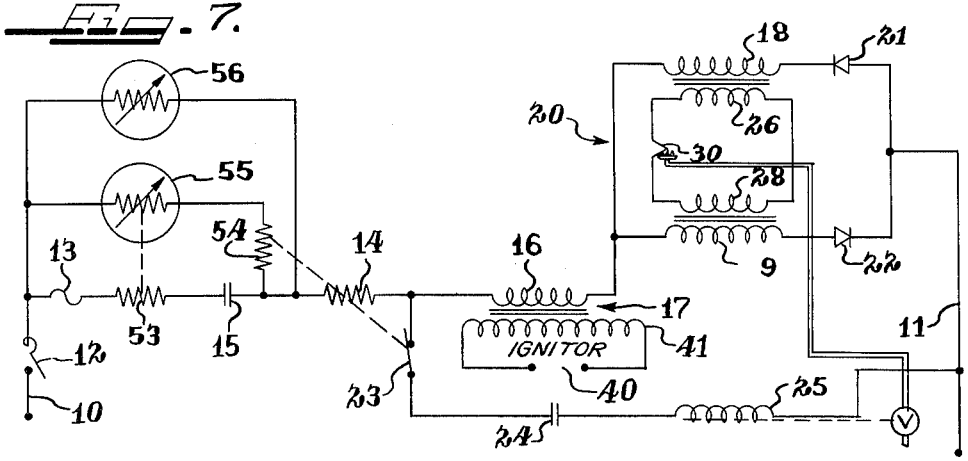
FIG. 7 is a schematic diagram of a fifth embodiment of the invention.

Referring now to the embodiment of the invention as illustrated in FIG. 7, this embodiment is the same as that illustrated in FIG. 6 except for the addition of a second negative temperature coefficient thermistor 56 connected in parallel with the negative temperature coefficient thermistor 55 and a warp switch heater 54. Thermistor 56 has a very small thermal mass so that it decreases its resistance rapidly in order to decrease the current in the warp switch heater 54 and keep it from opening the contacts 23 while the thermocouple 20 is heating. The operation of this embodiment during a normal ignition permits normal current flow for valve actuation and spark ignition in the manner described for the embodiment illustrated in FIG. 6. Then thermistor 56 immediately reduces the current. While the current is dropping due to this thermistor action, the thermocouple is also heating up to further accelerate the rate of decrease. This prevents the warp switch contacts 23 from opening prematurely. Thermistor 55 does not enter into the operation during a successful trial for ignition. It does enter in case of an unsuccessful trial as aforedescribed. During a successful ignition cycle and operation, the voltage across the two thermistors and capacitor 15 is very small because the thermocouple acting in accordance with the changes of the series inductance by the magnetic amplifier has caused the circuit to shift out of resonance.

The embodiments of the invention illustrated in FIGS. 8 and 9 are identical to those shown in FIGS. 6 and 7 with the exception that another pair of contacts 57 has been added to a warp switch which operates contacts 23 in place of the former fuse 13. The function of the additional contacts 57 is to de-energize an ignition circuit if failure occurs in the thermistor circuit. Contacts 57 are located with respect to a bimetal blade (not shown) of a warp switch so that if the thermistor circuit is working properly, the current through the warp switch heaters 14 and 54 is reduced and the heat generated is just sufficient to maintain contacts 23 open. In the event that a failure has occurred in the thermistor circuit containing either one of the thermistors, the current in warp switch heater 14 will remain high and the movement of the bimetal warp switch blade (not shown) will be much greater so that after opening contacts 23 such a bimetal blade will continue to warp until it snaps open contacts 57 to shut off the spark and gas completely. Contacts 57 will remain latched open and can only be reset manually. Latching contacts 57 open serves as a signal of component failure.

The embodiment of the invention illustrated in FIG. 10 shows an arrangement for the operation of large capacity valves with the parallel thermistor circuit composed of the aforementioned thermistor 55 and warp switch heater 54 is connected to a junction of the capacitor 15 and the transformer 17. The solenoid coil in the second series circuit is again a holding coil 52 and an actuating aid coil 51 is employed in the first series circuit between the condenser 15 and the transformer 17 as was aforementioned in the description of the embodiment shown in FIG. 5. Thus, with these connections, the thermistor 55 and the warp switch heater 54 operate in the same manner as they did in the embodiment illustrated in FIGS. 6 and 8, and the dual coils operate in the manner described for the embodiment shown in FIG. 5.

Figure 11:
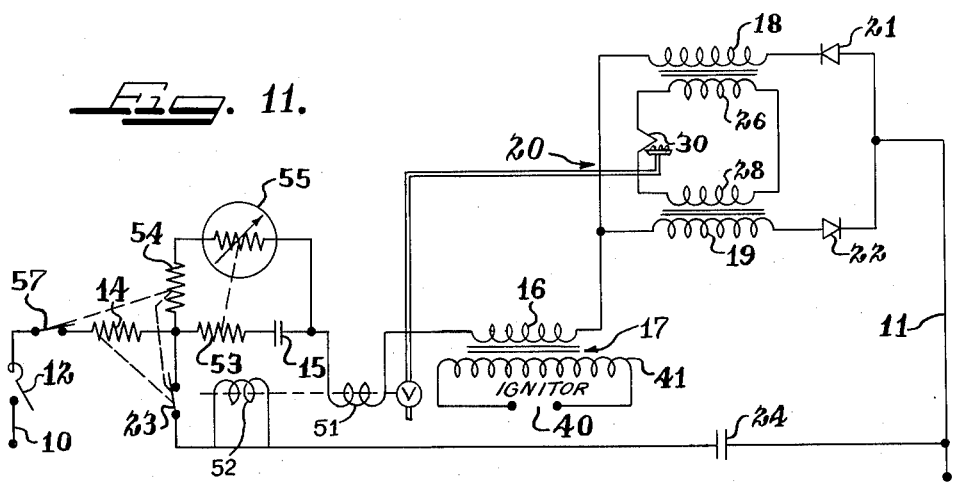
FIG. 11 is a schematic diagram of a ninth embodiment of the present invention.

The embodiment of the invention shown in FIG. 11 is identical to that shown in FIG. 10 with the exception that the fuse 13 has been replaced by a second set of warp switch contacts 57 as was illustrated and described in the embodiment of the invention shown in FIG. 8.

Figure 12:
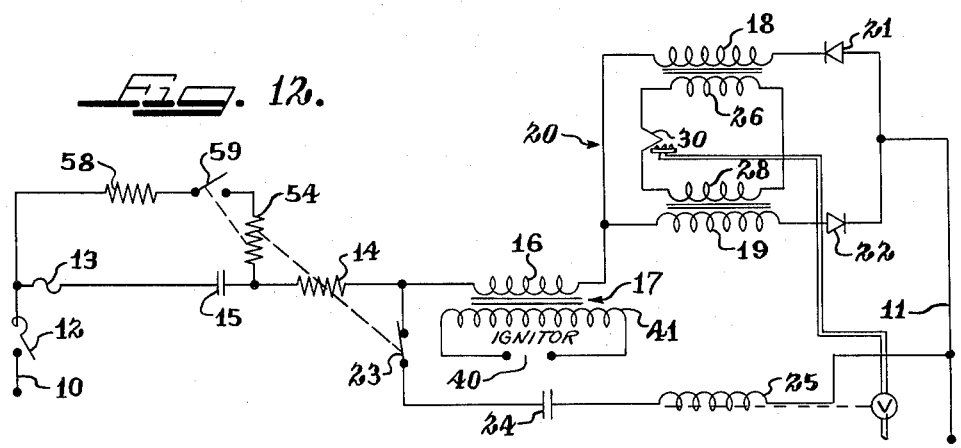
FIG. 12 is a schematic diagram of a tenth embodiment of the invention.
Figure 13:
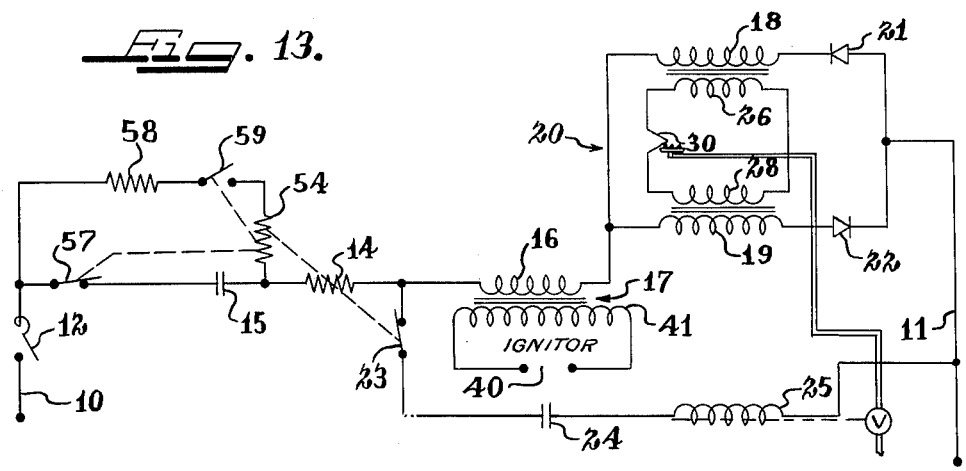
FIG. 13 is a schematic diagram of an eleventh embodiment of the present invention.

The embodiment of the invention shown in FIGS. 12 and 13 is similar to that illustrated in FIGS. 6 and 8 with the exception that the thermistor 55 has now been replaced with a resistor 58 and additional warp switch contacts 59. The thermistor in the embodiments of the invention in FIGS. 6 and 7 has provided an additional function of voltage regulation. As the line voltage is varied from 95 volts to 132 volts, the current through warp switch heater 14 will vary from 100 to 135 milliamperes. Although the embodiment of the invention as shown in FIG. 12 is more economical to construct than the embodiment shown in FIG. 6, the current range in the warp switch heater will vary from 100 to 185 milliamperes. Thus, in order to protect against a piece of foreign material preventing contacts 59 from closing, a fuse 13 must open circuit upon a continuous current of 200 milliamperes at 95 volts but not open circuit at 185 milliamperes. This is then a severe calibration requirement on the fuse 13 but as aforementioned provides a less expensive circuit to manufacture.

Figure 14:
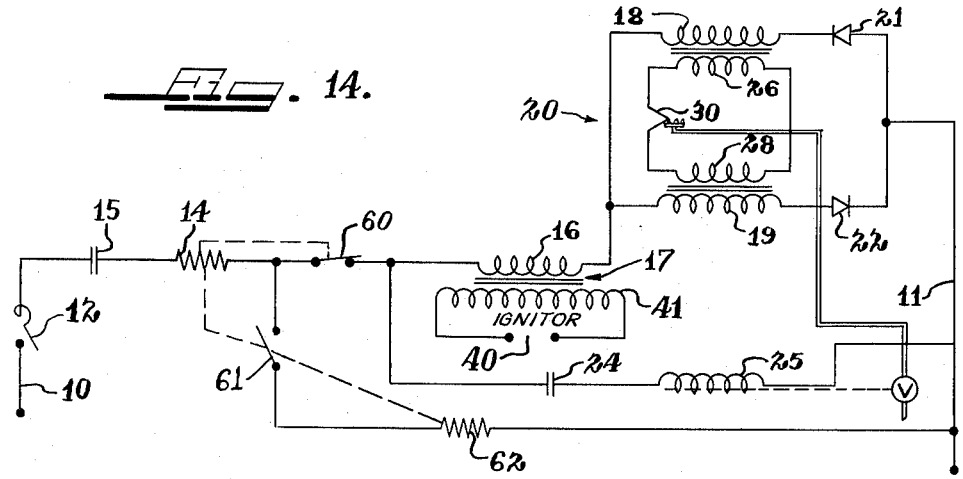
FIG. 14 is a schematic diagram of a twelfth embodiment of the invention.

The embodiment of the invention illustrated in FIG. 14 provides for a first series circuit of a resonant condenser 15, warp switch heater 14, a pair of warp switch contacts 60, a primary coil 16 of a transformer 17, and a magnetic amplifier 20 across power leads 10 and 11. A second circuit through the valve solenoid 25 consists of a series of the resonant capacitor 15, the warp switch heater 14, set of contacts 60, a capacitor 24, and valve solenoid 25. It may be noted that this circuit is similar to the series circuit including the valve solenoid 25 of the embodiment shown in FIG. 1, with the exception that a set of contacts 60 is found in both the first and second series circuit instead of a single set of contacts 23 in the second series circuit. A set of normally open warp switch contacts 61, which are controlled by the warp switch heater 14, are connected in series between the warp switch heater 14 and power lead 11 with a warp switch holding heater 62. This embodiment of the invention utilizes the warp switch heater 14 to open contacts 60 and "make before break" contacts 61. This provides a holding circuit from power lead 10 through capacitor 15, warp switch heater 14, contacts 61, and warp switch holding coil 62 to lead 11. When a failure of ignition occurs, capacitor 15 is used as a voltage dropping impedance to limit the current flowing in the warp switch heaters 14 and 62.

Figure 15:
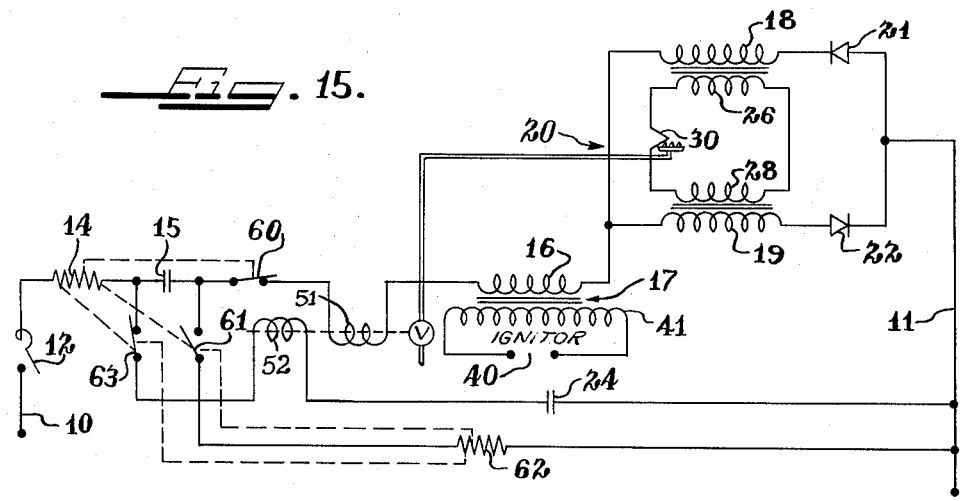
FIG. 15 is a schematic diagram of a thirteenth embodiment of the invention.

Referring now to the embodiment of the invention shown in FIG. 15, the operation of larger valves will employ this embodiment of the invention which is similar to the embodiment illustrated in FIG. 14 and employs an additional pair of normally closed contacts 63 to connect a capacitor 24 and a holding coil 52 to a junction of heater 14 and capacitor 15. This circuit is similar to the other circuits designed for larger valves in that it employs the two solenoid coil approach having an actuating coil 51 in a first series circuit for providing a spark and a holding solenoid 52 in the series circuit for operating a gas valve.

Figure 16:
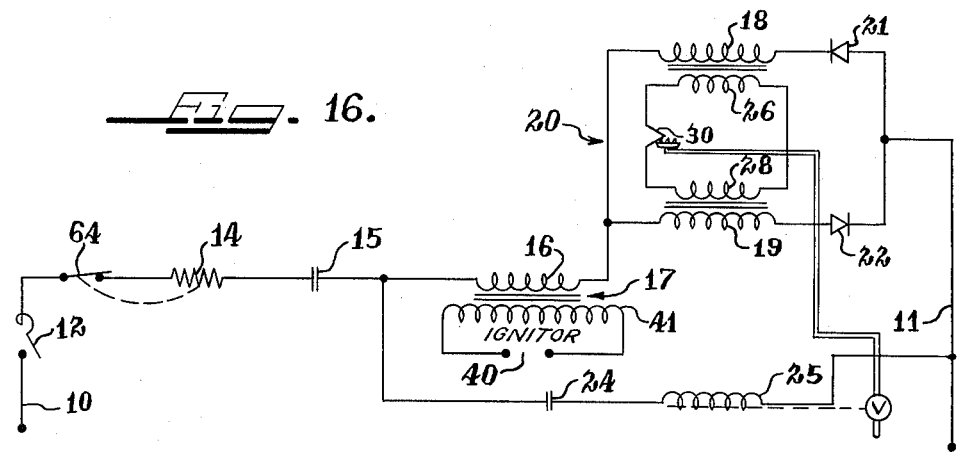
FIG. 16 is a schematic diagram of a fourteenth embodiment of the invention.

The embodiment of the invention illustrated in FIG. 16 is a simplification of the embodiment shown in FIG. 1 in that only a single warp switch heater 14 is utilized to open in the event of a failure at an ignition trial of a set of contacts 64 which opens both the first and second series circuits to cut off the spark and gas respectively. Whenever the contacts 64 open, the warp switch is latched open and must be reset manually. Therefore, the embodiment illustrated in FIG. 16, while containing a minimum number of circuit components and representing a minimum cost embodiment, does not have the automatic features of some of the aforementioned embodiments nor does it have the high reliability of other embodiments of the present invention.

I claim:
1. A spark ignition system for igniting fuel comprising:
means forming a series resonant circuit including means for energizing a spark gap to produce a spark for igniting said fuel when said circuit is connected across an alternating current source, and
heat responsive means operatively responsive to combustion of said fuel and connected to said circuit for detuning said circuit to extinguish said spark when heated by said fuel combustion to a certain level while maintaining said circuit energized by said alternating current source.

2. A spark ignition system comprising:
a means forming a series resonant circuit including a means for energizing a spark gap to produce a spark when connected across an alternating current source, and
thermistor means operatively connected in said series circuit and responsive to current flow therethrough for at least a certain time for changing the circuit impedance sufficiently to detune said circuit to extinguish said spark while maintaining said series circuit energized by said alternating current source.

3. A spark ignition system for igniting fuel fed to a burner through a valve comprising:
a means forming a series resonant circuit including a means for energizing a spark gap to produce a spark for igniting fuel fed to said burner when connected across an alternating current source,
heat responsive means responsive to combustion of said fuel at said burner for detuning said circuit to extinguish said spark, and
a valve actuator means for said valve connected in series with at least a portion of said resonant circuit across the alternating current source in order to initially open said valve and thereafter maintain the valve in open condition as decreasing voltage appears across the valve actuator as the resonant circuit is detuned.

4. A fuel and spark ignition system for igniting fuel at a burner which is connected to a valve for controlling fuel flow to the burner comprising:
a means forming a series resonant circuit including a means for energizing a spark gap to produce a spark at the burner adapted to be connected across an alternating current source,
means connected to said circuit for detuning said circuit to extinguish said spark,
a valve actuator means adapted to be connected in series with at least a portion of said resonant circuit across the alternating current source in order to initially open the valve and thereafter maintain the valve in open position as decreasing voltage appears across the valve actuator as the resonant circuit is detuned, and
means to limit the voltage appearing across said spark energizing means after the elapse of a predetermined period of time following its activation.

5. A fuel and spark ignition system for igniting fuel at a burner which is connected to a valve for controlling fuel flow to the burner comprising:
a means forming a series resonant circuit including a means for energizing a spark gap to produce a spark at the burner adapted to be connected across an alternating current source,
means connected to said circuit for detuning said circuit to extinguish said spark,
a valve actuator means adapted to be connected in series with at least a portion of said resonant circuit across the alternating current source in order to initially open the valve and thereafter maintain the valve in open position as decreasing voltage appears across the valve actuator as the resonant circuit is detuned, and means to limit the voltage appearing across said valve actuator after the elapse of a predetermined period following its activation.

6. A fuel and spark ignition system for igniting fuel at a burner which is connected to a valve for controlling fuel flow to the burner comprising:

a means forming a series resonant circuit including a means for energizing a spark gap to produce a spark at the burner adapted to be connected across an alternating current source, means connected to said circuit for detuning said circuit to extinguish said spark, a valve actuator means adapted to be connected in series with at least a portion of said resonant circuit across the alternating current source in order to initially open the valve and thereafter maintain the valve in open position as decreasing voltage appears across the valve actuator as the resonant circuit is detuned, a first means to limit the voltage appearing across said valve actuator after the elapse of a first predetermined period of time following its activation and a second means to limit the voltage appearing across said valve actuator after the elapse of a second predetermined period of time following its activation.

7. A fuel and spark ignition system for igniting fuel at a burner which is connected to a valve for controlling fuel flow to the burner comprising:

a means forming a series resonant circuit including a means for energizing a spark gap to produce a spark at the burner adapted to be connected across an alternating current source, means connected to said circuit for detuning said circuit to extinguish said spark, a valve actuator means adapted to be connected in series with at least a portion of said resonant circuit across the alternating current source in order to initially open the valve and thereafter maintain the valve in open position as decreasing voltage appears across the valve actuator as the resonant circuit is detuned, and means to limit the voltage appearing across said spark energizing means and said valve actuator after the elapse of a predetermined period of time following its activation.

8. A spark ignition system for igniting fuel at a burner comprising:

a means forming a series resonant circuit including an inductance, a capacitance, and a primary winding of a transformer adapted to be connected across an alternating current source, another means forming a circuit for producing a spark including a spark gap for igniting fuel emitted by the burner and a secondary winding of said transformer, combustion sensing means positioned to sense combustion at the burner, and means including said combustion sensing means for varying the inductance for detuning said series resonant circuit to extinguish said spark.

9. A fuel and spark ignition system for igniting fuel at a burner which is connected to a valve for controlling fuel flow to the burner comprising:

a means forming a series resonant circuit including an inductance, a capacitance, and a primary winding of a transformer adapted to be connected across an alternatinng current source, another means forming a circuit for producing a spark including a spark gap for igniting fuel emitted by the burner and a secondary winding of said transformer, combustion sensing means positioned to sense combustion at the burner, means including combustion sensing means for varying the inductance for detuning said series resonant circuit to extinguish said spark, and an electrical valve actuator means adapted to be connected in series with said capacitance across the alternating current source to initially open the valve and thereafter maintain the valve in open condition as decreasing voltage appears across said valve actuator as the resonant circuit is detuned.

10. A fuel and spark ignition system for igniting fuel at a burner which is connected to a valve for controlling fuel flow to the burner comprising:

a means forming a series resonant circuit including an inductance, a capacitance, and a primary winding of a transformer adapted to be connected across an alternating current source, another means forming a circuit for producing a spark including a spark gap for igniting fuel emitted by the burner and a secondary winding of said transformer, combustion sensing means positioned to sense combustion at the burner, means including said combustion sensing means for varying the inductance for detuning said series resonant circuit to extinguish said spark, an electrical valve actuator means adapted to be connected in series with said capacitance across the alternating current source to initially open the valve and thereafter maintain the valve in open position as decreasing voltage appears across said valve actuator as the resonant circuit is detuned, and means for limiting the voltage appearing across said primary winding to extinguish said spark after said spark has been activated for a preselected period of time.

11. A fuel and spark ignition system for igniting fuel at a burner which is connected to a valve for controlling fuel flow to the burner comprising:

a means forming a series resonant circuit including an inductance, a capacitance, and a primary winding of a transformer adapted to be connected across an alternating current source, another means forming a circuit for producing a spark including a spark gap for igniting fuel emitted by the burner and a secondary winding of said transformer, combustion sensing means positioned to sense combustion at the burner, means including said combustion sensing means for varying the inductance for detuning said series resonant circuit to extinguish said spark, an electrical valve actuator means adapted to be connected in series with said capacitance across the alternating current source to initially open the valve and thereafter maintain the valve in open position as decreasing voltage appears across said valve actuator as the resonant circuit is detuned, and means for limiting voltage appearing across said valve actuator to return said actuator to a valve closed position after said spark has been activated for a preselected period of time.

12. A fuel and spark ignition system for igniting fuel at a burner which is connected to a valve for controlling fuel flow to the burner comprising:

a means forming a series resonant circuit including an inductance, a capacitance, and a primary winding of a transformer adapted to be connected across an alternating current source, another means forming a circuit for producing a spark including a spark gap for igniting fuel emitted by the burner and a secondary winding of said transformer, combustion sensing means positioned to sense combustion at the burner, means including said combustion sensing means for varying the inductance for detuning said series resonant circuit to extinguish said spark, an electrical valve actuator means adapted to be connected in series with said capacitance across the alternating current source to initially open the valve and thereafter maintain the valve in open position as decreasing voltage appears across said valve actuator as the resonant circuit is detuned, a first means for limiting voltage appearing across said primary winding to extinguish said spark and for limiting voltage appearing across said valve actuator means and to return said actuator to a valve closed position after said spark has been activated for a preselected period of time, and a second means for limiting voltage appearing across said primary winding to extinguish said spark and for limiting voltage appearing across said valve actuator means and to return said actuator to a valve closed position after said spark has been activated for another preselected period of time which is longer than said aforementioned period of time.

13. A spark ignition system comprising:
a magnetic amplifier having a load winding and a control winding,
a transformer having a primary and a secondary winding,
a spark gap connected across the secondary winding of said transformer,
a thermocouple connected in series with the control winding of said magnetic amplifier,
a condenser, and
a series resonant circuit means adapted to be connected across an alternating current source and including said load winding, said primary winding, and said condenser.

14. A fuel and spark ignition system for igniting a fuel at a burner which is connected to a valve for controlling fuel flow to the burner comprising:
a magnetic amplifier having a load winding and a control winding,
a transformer having a primary and a secondary winding,
a spark gap connected across the secondary winding of said transformer for igniting fuel emitted by the burner,
a thermocouple connected in series with the control winding of said magnetic amplifier and positioned adjacent the burner,
a condenser,
an electrical valve actuator,
a first series circuit means adapted to be connected across an alternating current source and including said load winding, said primary winding and said condenser, and
a second series circuit means adapted to be connected across the alternating current source and including said condenser and said electrical valve actuator.

15. A fuel and spark ignition system for igniting fuel at a burner which is connected to a valve for controlling fuel flow to the burner comprising:
a magnetic amplifier consisting of a pair of magnetic reactors, each said reactor having a load winding and a control winding,
a transformer having a primary and a secondary winding,
a spark gap connected across the secondary winding of said transformer for igniting fuel emitted by the burner,
a thermocouple connected in series with the control windings of said magnetic amplifier and positioned adjacent the burner,
a condenser,
an electrical valve actuator for operating the valve,
a first series circuit means adapted to be connected across an alternating current source and including a parallel two arm circuit having one of said load windings connected in series with a rectifier in each arm, said primary winding and said condenser, and
a second series circuit means adapted to be connected across the alternating current source and including said condenser, and said electrical valve actuator.

16. A fuel and spark ignition system for igniting fuel at a burner which is connected to a valve for controlling fuel flow to the burner comprising:
a magnetic amplifier consisting of a pair of magnetic reactors, each said reactor having a load winding and a control winding,
a transformer having a primary and a secondary winding,
a spark gap connected across the secondary winding of said transformer for igniting fuel emitted by the burner,
a thermocouple connected in series with the control windings of said magnetic amplifier and positioned adjacent the burner,
a first condenser,
a second condenser,
a current control means,
an electrical valve actuator for operating the valve,
a first series circuit means adapted to be connected across an alternating current source and including a parallel two arm circuit having one of said load windings connected in series with a rectifier in each arm, said primary winding, said first condenser and said current control means, and
a second series circuit means adapted to be connected across the alternating current source and including said current control means, said first condenser, said second condenser, and said electrical valve actuator.

17. A fuel and spark ignition system for igniting fuel at a burner which is connected to a valve for controlling fuel flow to the burner comprising:
a magnetic amplifier consisting of a pair of magnetic reactors, each said reactor having a load winding, a bias winding, and a control winding,
a transformer having a primary and a secondary winding,
a spark gap connected across the secondary winding of said transformer for igniting fuel emitted by the burner,
a thermocouple connected in series with the control windings of said magnetic amplifier positioned adjacent the burner,
a condenser,
an electrical valve actuator,
a first series circuit means adapted to be connected across an alternating current source and including a parallel two arm circuit having one of said load windings connected in series with a rectifier in each arm, said primary winding, and said condenser,
a second series circuit means adapted to be connected across the alternating current source and including said condenser, and said electrical valve actuator, and
means for applying a bias voltage to said bias windings.

18. A fuel and spark ignition system for igniting fuel at a burner which is connected to a valve for controlling fuel flow to the burner comprising:
a magnetic amplifier consisting of a pair of magnetic reactors, each said reactor having a load winding, a bias winding, and a control winding,
a transformer having a primary and a secondary winding,
a spark gap connected across the secondary winding of said transformer for igniting fuel emitted by the burner,
a thermocouple connected in series with the control windings of said magnetic amplifier positioned adjacent the burner,
a first condenser,
a second condenser,
a current control means, an electrical valve actuator for operating the valve, a first series circuit means adapted to be connected across an alternating current source and including a parallel two arm circuit having each one of said load windings connected in series with a rectifier in each arm, said primary winding, said first condenser, and said current control means, a second series circuit means adapted to be connected across the alternating current source and including said current control means, said first condenser, said second condenser and an electrical valve actuator, and a bias circuit means adapted to be connected across the alternating current source and including resistance connected in series circuit with one of said bias windings and each one of said rectifiers.

19. A fuel and spark ignition system for igniting fuel at a burner which is connected to a valve for controlling fuel flow to the burner comprising:

a magnetic amplifier having a load winding and a control winding, a transformer having a primary and a secondary winding, a spark gap connected across the secondary winding of said transformer for igniting a fuel emitted by the burner, a thermocouple connected in series with the control winding of said magnetic amplifier positioned adjacent the burner, a first condenser, a second condenser, an electrical valve actuator, a warp switch having a heater coil, a normally closed set of contacts and a normally open set of contacts, a first series circuit means adapted to be connected across an alternating current source and including said load winding, said primary coil winding, said first condenser, and said heater coil, a second series circuit means adapted to be connected across the alternating current source and including the electrical valve actuator, said normally closed set of contacts, said second condenser, said first condenser, and said heater coil, and a third series circuit means adapted to be connected across the alternating current source and including said normally open set of contacts, said first condenser, and said heater coil.

20. A fuel and spark ignition system for igniting fuel at a burner which is connected to a valve for controlling fuel flow to the burner comprising:

a magnetic amplifier having a load winding and a control winding, a transformer having a primary and a secondary winding, a spark gap connected across the secondary winding of said transformer for igniting fuel emitted from the burner, a thermocouple connected in series with the control winding of said magnetic amplifier positioned adjacent the burner, a condenser, a warp switch having a heater coil and a normally closed set of contacts, an electrical valve actuator, a first series circuit means adapted to be connected across an alternating current source and including said load winding, said primary winding, said condenser, and said heater coil, and a second series circuit means adapted to be connected across the alternating current source and including said electrical valve actuator, said normally closed set of contacts, said condenser, and said heater coil.

21. A fuel and spark ignition system for igniting fuel at a burner which is connected to a valve for controlling fuel flow to the burner comprising:

a magnetic amplifier having a load winding and a control winding, a transformer having a primary and a secondary winding, a spark gap connected across the secondary winding of said transformer for igniting fuel emitted by the burner, a thermocouple connected in series with the control winding of said magnetic amplifier positioned adjacent the burner, a condenser, a positive temperature coefficient thermistor, an electrical valve actuator for operating the valve, a first series circuit means adapted to be connected across an alternating current source and including said load winding, said primary winding, said condenser, and said thermistor, and a second series circuit means adapted to be connected across the alternating current source and including said electrical valve actuator, another condenser, said first condenser, and said thermistor.

22. A fuel and spark ignition system for igniting fuel at a burner which is connected to a valve for controlling fuel flow to the burner comprising:

a magnetic amplifier having a load winding and a control winding, a transformer having a primary and a secondary winding, a spark gap connected across the secondary winding of said transformer for igniting fuel emitted by the burner, a thermocouple connected in series with the control winding of said magnetic amplifier positioned adjacent the burner, a condenser, an electrical valve actuator for operating the valve, having an actuation aid coil and a holding coil, a first series circuit means adapted to be connected across an alternating current source and including said load winding, said primary winding, said actuation aid coil, and said condenser, and a second series circuit means adapted to be connected across the alternating current source and including said holding coil and said condenser.

23. A fuel and spark ignition system for igniting fuel at a burner which is connected to a valve for controlling fuel flow to the burner comprising:

a magnetic amplifier having a load winding and a control winding, a transformer having a primary and a secondary winding, a spark gap connected across the secondary winding of said transformer for igniting fuel emitted by the burner, a thermocouple connected in series with the control winding of said magnetic amplifier positioned adjacent the burner, a first condenser, an electrical valve actuator for operating the valve having an actuation aid coil and a holding coil, a second condenser, a first series circuit means adapted to be connected across an alternating current source and including said load winding, said primary winding, said actuation aid coil, and said first condenser, and a second series circuit means adapted to be connected across the alternating current source and including said second condenser, said first condenser, and said holding coil.

24. A fuel and spark ignition system for igniting fuel at a burner which is connected to a valve for controlling fuel flow to the burner comprising:

a magnetic amplifier having a load winding and a control winding, a transformer having a primary and a secondary winding,
a spark gap connected across the secondary winding of said transformer for igniting fuel emitted by the burner,
a thermocouple connected in series with the control winding of said magnetic amplifier positioned adjacent the burner,
a condenser,
an electrical valve actuator for operating the valve having an actuation aid coil and a holding coil,
a positive temperature coefficient thermistor,
a fisrt series circuit means adapted to be connected across an alternating current source and including said load winding, said primary winding, said actuation aid coil, said condenser and said thermistor, and
a second series circuit means adapted to be connected across the alternating current source and including said holding coil and said thermistor.

25. A fuel and spark ignition system for igniting fuel at a burner which is connected to a valve for controlling fuel flow to the burner comprising:
a magnetic amplifier having a load winding and a control winding,
a transformer having a primary and a secondary winding,
a spark gap connected across the secondary winding of said transformer for igniting fuel emitted by the burner,
a thermocouple connected in series with the control winding of said magnetic amplifier positioned adjacent the burner,
a condenser,
a warp switch having a first heater coil, a second heater coil of relatively higher resistance than said first heater coil, and a normally closed set of contacts,
a negative temperature coefficient thermistor,
a resistance,
a means for limiting electrical current,
an electrical valve actuator for controlling the valve,
a first series circuit means adapted to be connected across an alternating current source and including said load winding, said primary winding, said first warp switch heater, said condenser, said resistance, and said means for limiting electrical current,
a second series circuit means adapted to be connected across the alternating current source and including said electrical valve actuator, said normally closed set of contacts, said first warp switch heater, said condenser, said resistance, and said means for limiting electrical current, and
a third circuit means including said thermistor and said second warp switch heater in series and connected in parallel with that portion of said first and second series circuits which consist of said condenser, said resistance, and said means for limiting an electrical current.

26. A fuel and spark ignition system for igniting fuel at a burner which is connected to a valve for controlling fuel flow to the burner comprising:
a magnetic amplifier having a load winding and a control winding,
a transformer having a primary and a secondary winding,
a spark gap connected across the secondary winding of said transformer for igniting fuel emitted by the burner,
a thermocouple connected in series with the control winding of said magnetic amplifier positioned adjacent the burner,
a condenser,
a warp switch having a first heater coil, a second heater coil of relatively greater resistance than said first heater coil, and a normally closed set of contacts,
a first negative temperature coefficient thermistor,
a second negative temperature coefficient thermistor having a smaller thermal mass than said first thermistor,
a resistance,
an electrical valve actuator for operating the valve,
a means for limiting electrical current,
a first series circuit means adapted to be connected across an alternating current source and including said load winding, said primary winding, said first warp switch heater, said condenser, said resistance, and said means for limiting electrical current,
a second series circuit means adapted to be connected across the alternating current source and including said electrical valve actuator, said normally closed set of contacts, said first warp switch heater, said condenser, said resistance, and said means for limiting electrical current,
a third circuit means including said first thermistor and said second warp switch heater in series connected in parallel with that portion of said first and second series circuit which consists of said condenser, said resistance, and said means for limiting electrical current, and
a fourth circuit means including said second thermistor connected in parallel with said third circuit.

27. A fuel and spark ignition system for igniting fuel at a burner which is connected to a valve for controlling fuel flow to the burner comprising:
a magnetic amplifier having a load winding and a control winding,
a transformer having a primary and a secondary winding,
a spark gap connected across the secondary winding of said transformer for igniting fuel emitted from the burner,
a thermocouple connected in series with the control winding of said magnetic amplifier positioned adjacent the burner,
a condenser,
a warp switch having a first heater coil, a second heater coil having a relatively greater resistance than said first heater coil, a first set of contacts and a second set of contacts,
a negative temperature coefficient thermistor,
a resistance,
an electrical valve actuator for operating the valve,
a first series circuit means adapted to be connected across said alternating current source and including said load winding, said primary winding, said first warp switch heater, said condenser, said resistance, and said first set of contacts,
a second series circuit means adapted to be connected across an alternating current source and including said electrical valve actuator, said second set of contacts, said first warp switch heater, said condenser, said resistance, and said first set of contacts, and
a third circuit means including said thermistor and said second warp switch heater in series connected in parallel with that portion of said first and second series circuits which consists of said condenser, said resistance, and said first set of contacts.

28. In combination with the fuel and spark ignition system specified in claim 27 another negative temperature coefficient thermistor having a relatively smaller thermal mass than said first mentioned thermistor connected in parallel with said third circuit.

29. The fuel and spark ignition system for igniting fuel at a burner which is connected to a valve for controlling fuel flow to the burner comprising:
a magnetic amplifier having a load winding and a control winding,
a transformer having a primary and a secondary winding,
a spark gap connected across the secondary winding of said transformer for igniting fuel emitted from the burner,
a thermocouple connected in series with the control winding of said magnetic amplifier and positioned adjacent the burner,
a condenser,
a warp switch having a first heater coil, a second heater coil with a resistance greater than said first heater coil, and a normally closed set of contacts,
a negative temperature coefficient thermistor,
a resistance,
a means for limiting electrical current,
an electrical valve actuator for operating the valve,
a first series circuit means adapted to be connected across an alternating current source and including said load winding, said primary winding, said condenser, said resistance, said first warp switch heater, and said means for limiting electrical current,
a second series circuit means adapted to be connected across the alternating current source and including said electrical valve actuator, said set of contacts, said first warp switch heater, and said means for limiting electrical current, and
a third circuit means including said second warp switch heater and said thermistor in series and connected in parallel across said serially connected condenser and resistance of said first series circuit.

30. A fuel and spark ignition system for igniting fuel at a burner which is connected to a valve for controlling fuel flow to the burner comprising:
a magnetic amplifier having a load winding and a control winding,
a transformer having a primary and a secondary winding,
a spark gap connected across the secondary winding of said transformer for igniting fuel emitted from the burner,
a thermocouple connected in series with the control winding of said magnetic amplifier and positioned adjacent the burner,
a condenser,
a warp switch having a first heater coil, a second heater coil of greater resistance than said first heater coil, a first set of contacts and a second set of contacts,
a negative temperature coefficient thermistor,
a resistance,
an electrical valve actuator for operating the valve,
a first series circuit means adapted to be connected across an alternating current source and including said load winding coils, said primary winding, said condenser, said resistance, said first warp switch heater, and said first set of contacts,
a second series circuit means adapted to be connected across the alternating current source and including said electrical valve actuator, said second set of contacts, said first warp switch heater, and said first set of contacts, and
a third circuit means including said second warp switch heater and said thermistor in series and connected in parallel with the serially connected condenser and resistance in said first series circuit.

31. A fuel and spark ignition system for igniting fuel at a burner which is connected to a valve for controlling fuel flow to the burner comprising:
a magnetic amplifier having a load winding and a control winding,
a transformer having a primary and a secondary winding,
a spark gap connected across the secondary winding of said transformer for igniting fuel emitted from the burner,
a thermocouple connected in series with the control winding of said magnetic amplifier and positioned adjacent the burner,
a condenser,
a warp switch having a first heater coil, a second heater coil of relatively greater resistance than said first heater coil, a first set of contacts and a second set of contacts,
a resistance,
an electrical valve actuator for operating the valve,
a means for limiting electrical current,
a first series circuit means adapted to be connected across an alternating current source and including said load winding, said primary winding, said first warp switch heater, said condenser, and said means for limiting electrical current,
a second series circuit means adapted to be connected across the alternating current source and including said electrical valve actuator, said first set of contacts, said first warp switch heater, said condenser, and said means for limiting electrical current, and
a third circuit means including said resistance, said second set of contacts, and said second warp switch heater in series and connected in parallel with that portion of said first and second series circuit which includes said serially connected condenser and means for limiting electrical current.

32. A fuel and spark ignition system for igniting fuel at a burner which is connected to a valve for controlling fuel flow to the burner comprising:
a magnetic amplifier having a load winding and a control winding,
a transformer having a primary and a secondary winding,
a spark gap connected across the secondary winding of said transformer for igniting fuel emitted from the burner,
a thermocouple connected in series with the control winding of said magnetic amplifier and positioned adjacent the burner,
a condenser,
a warp switch having a first heater coil, a second heater coil of relatively greater resistance than said first heater coil, a first set of contacts, a second set of contacts, and a third set of contacts,
a resistance,
an electrical valve actuator for operating the valve,
a first series circuit means adapted to be connected across an alternating current source and including said load winding, said primary winding, said first warp switch heater, said condenser, and said first set of contacts,
a second series circuit means adapted to be connected across the alternating current source and including said electrical valve actuator, said second set of contacts, said first warp switch heater, said condenser, and said first set of contacts, and
a third circuit means including said resistance, said third set of contacts and said second warp switch heater in series and connected in parallel with the portion of said first and second series circuit which contain the serially connected condenser and said first set of contacts.

33. A fuel and spark ignition system for igniting fuel at a burner which is connected to a valve for controlling fuel flow to the burner comprising:
a magnetic amplifier having a load winding and a control winding,
a transformer having a primary and a secondary winding,
a spark gap connected across the secondary winding of said transformer for igniting fuel emitted from the burner,
a thermocouple connected in series with the control winding of said magnetic amplifier and positioned adjacent the burner,
a condenser,
a warp switch having a first heater, a first set of contacts, a second set of contacts, and a warp switch holding heater, an electrical valve actuator for operating the valve,
a first series circuit means adapted to be connected across an alternating current source and including said load winding, said primary winding, said first set of contacts, said warp switch first heater, and said condenser,
a second series circuit means adapted to be connected across the alternating current source and including said electrical valve actuator, said warp switch first heater and said condenser, and
a third series circuit means adapted to be connected across the alternating current source including said warp switch holding heater, said second set of contacts, said warp switch first heater, and said condenser.

34. A fuel and spark ignition system for igniting fuel at a burner which is connected to a valve for controlling fuel flow to the burner comprising:
a magnetic amplifier having a load winding and a control winding,
a transformer having a primary and a secondary winding,
a spark gap connected across the secondary winding of said transformer for igniting fuel emitted from the burner,
a thermocouple connected in series with the control winding of said magnetic amplifier and positioned adjacent the burner,
a condenser,
a warp switch having a first heater, a first set of contacts, a second set of contacts, a third set of contacts, and a switch holding heater,
an electrically operated valve actuator for operating the valve having a holding coil and an actuating aid coil,
a first series circuit means adapted to be connected across an alternating current source and including said load winding, said primary winding, said actuating aid coil, said first set of contacts, said condenser, and said warp switch heater,
a second series circuit means adapted to be connected across the alternating current source and including said valve actuator holding coil, said second set of contacts, and said warp switch first heater, and
a third series circuit means adapted to be connected across the alternating current source including said warp switch holding heater, said third set of contacts, said condenser, and said warp switch first heater.

35. A fuel and spark ignition system for igniting fuel at a burner which is connected to a valve for controlling fuel flow to the burner comprising:
a magnetic amplifier having a load winding and a control winding,
a transformer having a primary and a secondary winding,
a spark gap connected across the secondary winding of said transformer for igniting fuel emitted from the burner,
a thermocouple connected in series with the control winding of said magnetic amplifier and positioned adjacent the burner,
a condenser,
a warp switch having a heater coil, and a set of contacts,
an electrical valve actuator for operating the valve,
a first series circuit means adapted to be connected across an alternating current source and including said load winding, said primary winding, said condenser, said warp switch heater, and said set of contacts, and
a second series circuit means adapted to be connected across the alternating current source and including said electrical valve actuator, said condenser, said warp switch heater, and said set of contacts.

References Cited by the Examiner

UNITED STATES PATENTS

| | | | |
|---|---|---|---|
| 2,073,718 | 3/1937 | Vawter | 158—28 X |
| 2,126,199 | 8/1938 | Lilja | 158—28 |
| 2,196,442 | 4/1940 | Maynard | 158—28 |
| 2,406,185 | 8/1946 | Aubert | 158—28 |
| 2,720,614 | 10/1955 | Cairns | 158—28 |
| 2,826,588 | 3/1958 | Smits | 317—125 X |
| 2,978,588 | 4/1961 | Mitchell et al. | 317—125 X |
| 2,985,797 | 5/1961 | Williams et al. | 158—28 |

FOREIGN PATENTS

| | | |
|---|---|---|
| 335,536 | 3/1930 | Great Britain. |
| 344,001 | 3/1931 | Great Britain. |

JAMES W. WESTHAVER, *Primary Examiner.*

MEYER PERLIN, FREDERICK L. MATTESON, Jr.,
*Examiners.*